(12) United States Patent
Tanaka et al.

(10) Patent No.: US 10,759,925 B2
(45) Date of Patent: Sep. 1, 2020

(54) PREPARATION METHOD OF RUBBER COMPOSITION FOR TIRE AND PRODUCTION METHOD OF TIRE

(71) Applicant: SUMITOMO RUBBER INDUSTRIES, LTD., Kobe-shi, Hyogo (JP)

(72) Inventors: Tatsuhiro Tanaka, Kobe (JP); Takayuki Nagase, Kobe (JP); Keiji Ikeda, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 554 days.

(21) Appl. No.: 15/706,232

(22) Filed: Sep. 15, 2017

(65) Prior Publication Data

US 2018/0094126 A1 Apr. 5, 2018

(30) Foreign Application Priority Data

Sep. 30, 2016 (JP) .................. 2016-194767

(51) Int. Cl.
*C08L 9/06* (2006.01)
*B60C 1/00* (2006.01)
*C08K 5/44* (2006.01)
*C08K 5/548* (2006.01)

(52) U.S. Cl.
CPC .............. *C08L 9/06* (2013.01); *B60C 1/0016* (2013.01); *C08K 5/44* (2013.01); *C08K 5/548* (2013.01); *C08L 2205/02* (2013.01); *C08L 2205/06* (2013.01)

(58) Field of Classification Search
CPC .. C08L 9/06; C08K 5/44; C08K 5/548; B60C 1/0016
See application file for complete search history.

(56) References Cited

U.S. PATENT DOCUMENTS

2009/0186965 A1* 7/2009 Rodgers .................... C08L 9/06
524/52
2012/0053263 A1 3/2012 Miyazaki

FOREIGN PATENT DOCUMENTS

JP 2009-120819 A 6/2009
JP 2012-46602 A 3/2012

* cited by examiner

*Primary Examiner* — Peter D. Mulcahy
(74) *Attorney, Agent, or Firm* — Birch, Stewart, Kolasch & Birch, LLP

(57) ABSTRACT

A preparation method of a rubber composition for a tire assures that good processability can be obtained even if a silane coupling agent having a mercapto group is blended. The preparation method of a rubber composition for a tire characterized by initiating kneading of a rubber component and a compound of the formula (1) before kneading the rubber component and a silane coupling agent having a mercapto group.

(1)

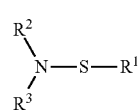

(Wherein $R^1$ represents a straight-chain or branched chain alkyl group having 1 to 18 carbon atoms or a cycloalkyl group having 3 to 12 carbon atoms, and $R^2$ and $R^3$ together with nitrogen bonded thereto form a succinimide group, a maleimide group or a phthalimide group.)

6 Claims, No Drawings

PREPARATION METHOD OF RUBBER COMPOSITION FOR TIRE AND PRODUCTION METHOD OF TIRE

TECHNICAL FIELD

The present disclosure relates to a preparation method of a rubber composition for a tire and a production method of a tire.

BACKGROUND OF THE INVENTION

Recently, in the light of resources saving, energy saving and in addition, protection of environment, a strong demand for reduction of exhausted carbon dioxide is increasing, and various countermeasures such as weight saving of a vehicle and use of electric energy have been considered. Accordingly, it is demanded to enhance fuel efficiency by decreasing rolling resistance of a tire for a vehicle, and also improvement of performances such as durability is desired.

For example, there are known, as a method for decreasing rolling resistance, techniques such as blending of silica, decrease in an amount of a filler, use of a filler having less reinforcing property. However, there is a tendency that a mechanical strength of a rubber decreases and various performances are degraded.

In JP 2009-120819 A, use of a silane coupling agent having a highly reactive mercapto group (mercapto silane coupling agent) for the purpose of improving performance such as fuel efficiency has been considered. However, in a mercapto silane coupling agent, good fuel efficiency, wet grip performance and abrasion resistance are obtained while since the mercapto silane coupling agent has high reactivity, there is a concern that gelation occurs during kneading with a rubber component and processability is lowered.

Meanwhile, JP 2012-046602 A describes that a rubber composition comprises N-cyclohexylthiophthalimide as a retarder in a compounding formulation comprising a silane coupling agent having a mercapto group.

SUMMARY OF THE INVENTION

However, in JP 2012-046602 A, only a role of a retarder is described, and the silane coupling agent having a mercapto group and N-cyclohexylthiophthalimide are kneaded in the same kneading step, and there is a room for improvement with respect to processability.

An object of the present disclosure is to provide a preparation method of a rubber composition for a tire which assures that good processability can be obtained even if a silane coupling agent having a mercapto group is blended, and a production method of a tire.

The present inventors have made intensive studies and as a result, have found that in a method of preparing a rubber composition for tire by blending a silane coupling agent having a mercapto group, processability of an unvulcanized rubber can be improved and the above-mentioned problem can be solved by initiating kneading of a rubber component and a compound represented by the following formula (1) before kneading the rubber component and the silane coupling agent having a mercapto group. The present inventors have made further studies and have completed the present disclosure.

Namely, the present disclosure relates to:

[1] a method of preparing a rubber composition for a tire comprising initiating kneading of a rubber component and a compound represented by the following formula (1) before kneading the rubber component and a silane coupling agent having a mercapto group:

wherein $R^1$ represents a straight-chain or branched chain alkyl group having 1 to 18 carbon atoms or a cycloalkyl group having 3 to 12 carbon atoms, and $R^2$ and $R^3$ together with nitrogen bonded thereto form a succinimide group, a maleimide group or a phthalimide group,

[2] the preparation method of the above [1], wherein the rubber component comprises not less than 50% by mass, preferably not less than 60% by mass, more preferably not less than 70% by mass of a diene rubber having a styrene content of 25 to 50% by mass, preferably 28 to 47% by mass, more preferably 31 to 44% by mass and an amount of a vinyl bond of 10 to 35 mole %, preferably 12 to 33 mole %, more preferably 14 to 31 mole %,

[3] the preparation method of the above [2], wherein the above-mentioned styrene content is not less than 2 times, preferably not less than 2.2 times the amount of a vinyl bond,

[4] the preparation method of any of the above [1] to [3], wherein the silane coupling agent having a mercapto group is a compound represented by the following formula (2) and/or a compound comprising a bonding unit A represented by the following formula (3) and a bonding unit B represented by the following formula (4):

wherein $R^{101}$ to $R^{103}$ represent a straight-chain or branched chain alkyl group having 1 to 12 carbon atoms, a straight-chain or branched chain alkoxy group having 1 to 12 carbon atoms, or a group represented by $-O-(R^{111}-O)_z-R^{112}$ (z $R^{111}$s represent straight-chain or branched chain divalent hydrocarbon groups having 1 to 30 carbon atoms, z $R^{111}$s may be the same or different, $R^{112}$ represents a straight-chain or branched chain alkyl group having 1 to 30 carbon atoms, a straight-chain or branched chain alkenyl group having 2 to 30 carbon atoms, an aryl group having 6 to 30 carbon atoms or an aralkyl group having 7 to 30 carbon atoms, z represents an integer of 1 to 30), $R^{101}$ to $R^{103}$ may be the same or different, and $R^{104}$ represents a straight-chain or branched chain alkylene group having 1 to 6 carbon atoms,

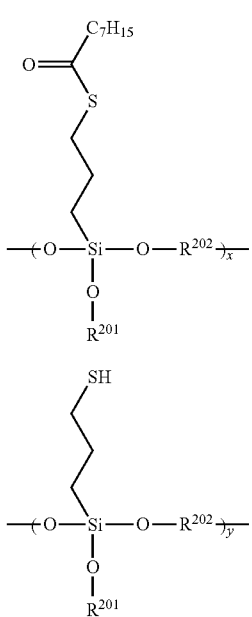

(3)

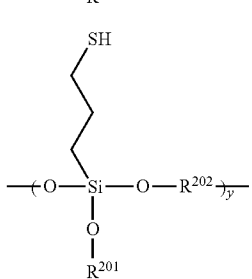

(4)

wherein x is an integer of 0 or more, y is an integer of 1 or more, $R^{201}$ represents a hydrogen atom, a halogen atom, a straight-chain or branched chain alkyl group having 1 to 30 carbon atoms, a straight-chain or branched chain alkenyl group having 2 to 30 carbon atoms, a straight-chain or branched chain alkynyl group having 2 to 30 carbon atoms, or the above alkyl group in which a terminal hydrogen atom has been replaced with a hydroxyl group or a carboxyl group, $R^{202}$ represents a straight-chain or branched chain alkylene group having 1 to 30 carbon atoms, a straight-chain or branched chain alkenylene group having 2 to 30 carbon atoms, or a straight-chain or branched chain alkynylene group having 2 to 30 carbon atoms, and a ring structure may be formed with $R^{201}$ and $R^{202}$,

[5] a method of producing a tire comprising a step of forming a tire member from the rubber composition for tire obtained by the preparation method of any of the above [1] to [4] and forming a green tire by combining the tire member with other tire members, and a vulcanization step of vulcanizing the green tire obtained in the forming step,

[6] a rubber composition for a tire comprising a rubber component, a silane coupling agent having a mercapto group and a compound represented by the following formula (1), which is prepared by kneading the silane coupling agent having a mercapto group with the rubber component with which the compound represented by the following formula (1) is kneaded.

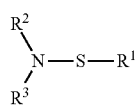

(1)

wherein $R^1$ represents a straight-chain or branched chain alkyl group having 1 to 18 carbon atoms or a cycloalkyl group having 3 to 12 carbon atoms, and $R^2$ and $R^3$ together with nitrogen bonded thereto form a succinimide group, a maleimide group or a phthalimide group.

According to the method of preparing a rubber composition for tire of the present disclosure, which is characterized in that kneading of a rubber component with a compound represented by the above-mentioned formula (1) is initiated before kneading of the rubber component with a silane coupling agent having a mercapto group, a rubber composition assuring that deterioration of a rubber sheet is inhibited and processability is improved can be prepared.

DETAILED DESCRIPTION

The method of preparing a rubber composition for tire of the present disclosure is characterized in that kneading of a rubber component with a specific compound represented by the above-mentioned formula (1) is initiated before kneading of the rubber component with a silane coupling agent having a mercapto group. In a composition comprising a rubber component and silica, by use of a silane coupling agent having a mercapto group, it can be expected that fuel efficiency and wet grip performance can be enhanced in good balance and abrasion resistance can be improved. Meanwhile, there is a problem with processability such as deterioration of a rubber sheet at the time of mixing, and it is considered a reason therefor is such that the mercapto group of the silane coupling agent is easily subject to radicalization at the time of mixing and is bonded to a polymer, resulting in gelation. According to the feature of the present disclosure such that kneading of a rubber component with a compound represented by the above-mentioned formula (1) is initiated before kneading of the rubber component with a silane coupling agent having a mercapto group, even in the case of using a silane coupling agent having a mercapto group, deterioration of a rubber sheet can be prevented and process capability can be improved remarkably. This effect is considered to be such that the radicalized mercapto group of the silane coupling agent reacts with the structure:

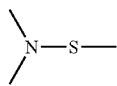

of the compound of the formula (1) before reaction with the rubber component to form a —S—S— bond (namely a radical derived from the mercapto group is captured by the polysulfide compound), thereby lowering reactivity of the silane coupling agent with the rubber component and enabling gelation to be prevented, and furthermore, when the temperature becomes high during the vulcanization, this disulfide bond is cut and reacts with the rubber component, thereby being capable of fulfilling a function as a silane coupling agent. Here, since reactivity of the silane coupling agent having a mercapto group is very high, in the present disclosure, the compound of the formula (1) is kneaded with the rubber component before kneading the silane coupling agent having a mercapto group with the rubber component but not coincidentally with the kneading of the silane coupling agent having a mercapto group, so that radicals can be captured efficiently from the time when radicalization of the silane coupling agent having a mercapto group begins.

In the present disclosure, the compound represented by the formula (1) is one represented by:

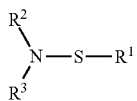

(1)

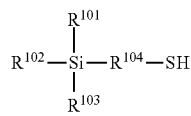

(2)

wherein $R^1$ represents a straight-chain or branched chain alkyl group having 1 to 18 carbon atoms or a cycloalkyl group having 3 to 12 carbon atoms, and $R^2$ and $R^3$ together with nitrogen bonded thereto form a succinimide group, a maleimide group or a phthalimide group.

$R^1$ in the above formula (1) is a straight-chain or branched chain alkyl group having 1 to 18 carbon atoms or a cycloalkyl group having 3 to 12 carbon atoms. Examples of the straight-chain or branched chain alkyl group include methyl, ethyl, n-propyl, iso-propyl, n-butyl, 4-methylpentyl, 2-ethylhexyl, octyl, octadecyl, and the like, and examples of the cycloalkyl group include cyclopropyl, cyclopentyl, cyclohexyl, cyclooctyl, and the like. Among these, $R^1$ is preferably a cycloalkyl group having 5 to 8 carbon atoms and more preferably cyclopentyl, cyclohexyl and cyclooctyl.

$R^2$ and $R^3$ in the above-mentioned formula (1) together with nitrogen bonded thereto form a succinimide group, a maleimide group or a phthalimide group. Particularly it is preferable that $R^2$ and $R^3$ together with nitrogen bonded thereto form a phthalimide group.

Example of the compound represented by the formula (1) includes N-cyclohexylthiophthalimide, and Retarder CTP manufactured by OUCHI SHINKO CHEMICAL INDUSTRIAL CO., LTD., Retarder PVI manufactured by Monsant Chemical Co., Ltd., and the like can be used.

A content of the compound represented by the formula (1) is preferably not less than 0.3 part by mass, more preferably not less than 0.5 part by mass based on 100 parts by mass of silica. When the content of the compound of the formula (1) is not less than 0.3 part by mass, an unvulcanized rubber sheet after the kneading tends to become smooth remarkably. On the other hand, the content of the compound of the formula (1) is preferably not more than 10 parts by mass, more preferably not more than 5 parts by mass based on 100 parts by mass of silica. When the content of the compound of the formula (1) is not more than 10 parts by mass, there is a tendency that deterioration of a breaking strength and abrasion resistance does not occur.

A content of the compound of the formula (1) is preferably not less than 1 part by mass, more preferably not less than 3 parts by mass based on 100 parts by mass of the silane coupling agent having a mercapto group. When the content of the compound of the formula (1) is not less than 1 part by mass, an unvulcanized rubber sheet after the kneading tends to become smooth remarkably. On the other hand, the content of the compound of the formula (1) is preferably not more than 100 parts by mass, more preferably not more than 50 parts by mass based on 100 parts by mass of the silane coupling agent having a mercapto group. When the content of the compound of the formula (1) is not more than 100 parts by mass, there is a tendency that deterioration of a breaking strength and abrasion resistance foes not occur.

In the present disclosure, it is preferable that the silane coupling agent having a mercapto group is a compound represented by the following formula (2) and/or a compound comprising a bonding unit A represented by the following formula (3) and a bonding unit B represented by the following formula (4).

wherein $R^{101}$ to $R^{103}$ represent a straight-chain or branched chain alkyl group having 1 to 12 carbon atoms, a straight-chain or branched chain alkoxy group having 1 to 12 carbon atoms, or a group represented by —O—$(R^{111}$—O$)_z$—$R^{112}$ (z $R^{111}$s represent straight-chain or branched chain divalent hydrocarbon groups having 1 to 30 carbon atoms, z $R^{111}$s may be the same or different, $R^{112}$ represents a straight-chain or branched chain alkyl group having 1 to 30 carbon atoms, a straight-chain or branched chain alkenyl group having 2 to 30 carbon atoms, an aryl group having 6 to 30 carbon atoms or an aralkyl group having 7 to 30 carbon atoms, z represents an integer of 1 to 30), $R^{101}$ to $R^{103}$ may be the same or different, and $R^{104}$ represents a straight-chain or branched chain alkylene group having 1 to 6 carbon atoms,

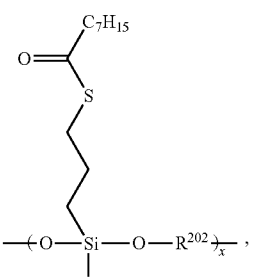

(3)

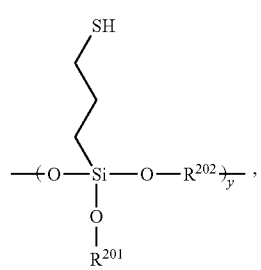

(4)

wherein x is an integer of 0 or more, y is an integer of 1 or more, $R^{201}$ represents a hydrogen atom, a halogen atom, a straight-chain or branched chain alkyl group having 1 to 30 carbon atoms, a straight-chain or branched chain alkenyl group having 2 to 30 carbon atoms, a straight-chain or branched chain alkynyl group having 2 to 30 carbon atoms, or the above alkyl group in which a terminal hydrogen atom has been replaced with a hydroxyl group or a carboxyl group, $R^{202}$ represents a straight-chain or branched chain alkylene group having 1 to 30 carbon atoms, a straight-chain or branched chain alkenylene group having 2 to 30 carbon atoms, or a straight-chain or branched chain alkynylene group having 2 to 30 carbon atoms, and a ring structure may be formed with $R^{201}$ and $R^{202}$.

The compound represented by the above formula (2) is described below.

$R^{101}$ to $R^{103}$ represent a straight-chain or branched chain alkyl group having 1 to 12 carbon atoms, a straight-chain or branched chain alkoxy group having 1 to 12 carbon atoms, or a group represented by —O—$(R^{111}$—O$)_z$—$R^{112}$. From the viewpoint that the effect of the present disclosure can be obtained satisfactorily, it is preferable that at least one of $R^{101}$ to $R^{103}$ is a group represented by —O—$(R^{111}$—O$)_z$—$R^{112}$, and it is more preferable that two of $R^{101}$ to $R^{103}$ are groups represented by —O—$(R^{111}$—O$)_z$—$R^{112}$, and the remaining one is a straight-chain or branched chain alkoxy group having 1 to 12 carbon atoms.

Examples of the straight-chain or branched chain alkyl group having 1 to 12 carbon atoms (preferably 1 to 5 carbon atoms) of $R^{101}$ to $R^{103}$ include methyl, ethyl, n-propyl, isopropyl, n-butyl, iso-butyl, sec-butyl, tert-butyl, pentyl, hexyl, heptyl, 2-ethylhexyl, octyl, nonyl and the like.

Examples of the straight-chain or branched chain alkoxy group having 1 to 12 carbon atoms (preferably 1 to 5 carbon atoms) of $R^{101}$ to $R^{103}$ include methoxy, ethoxy, n-propoxy, isopropoxy, n-butoxy, iso-butoxy, sec-butoxy, tert-butoxy, pentyloxy, hexyloxy, heptyloxy, 2-ethylhexyloxy, octyloxy, nonyloxy, and the like.

In —O—$(R^{111}$—O$)_z$—$R^{112}$ of $R^{101}$ to $R^{103}$, $R^{111}$ represents a straight-chain or branched chain divalent hydrocarbon group having 1 to 30 carbon atoms (preferably 1 to 15 carbon atoms, more preferably 1 to 3 carbon atoms). Examples of the hydrocarbon group include a straight-chain or branched chain alkylene group having 1 to 30 carbon atoms, a straight-chain or branched chain alkenylene group having 2 to 30 carbon atoms, a straight-chain or branched chain alkynylene group having 2 to 30 carbon atoms, an arylene group having 6 to 30 carbon atoms, and the like. Among these, a straight-chain or branched chain alkylene group having 1 to 30 carbon atoms is preferable.

Examples of the straight-chain or branched chain alkylene group having 1 to 30 carbon atoms (preferably 1 to 15 carbon atoms, more preferably 1 to 3 carbon atoms) of $R^{111}$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, and the like.

Examples of the straight-chain or branched chain alkenylene group having 2 to 30 carbon atoms (preferably 2 to 15 carbon atoms, more preferably 2 or 3 carbon atoms) of $R^{111}$ include vinylene, 1-propenylene, 2-propenylene, 1-butenylene, 2-butenylene, 1-pentenylene, 2-pentenylene, 1-hexenylene, 2-hexenylene, 1-octenylene, and the like.

Examples of the straight-chain or branched chain alkynylene group having 2 to 30 carbon atoms (preferably 2 to 15 carbon atoms, more preferably 2 or 3 carbon atoms) of $R^{111}$ include ethynylene, propynylene, butynylene, pentynylene, hexynylene, heptynylene, octynylene, nonynylene, decynylene, undecynylene, dodecynylene, and the like.

Examples of the arylene group having 6 to 30 carbon atoms (preferably 6 to 15 carbon atoms) of $R^{111}$ include phenylene, tolylene, xylylene, naphthylene, and the like.

The z is an integer of 1 to 30, preferably 2 to 20, more preferably 3 to 7, further preferably 5 or 6.

$R^{112}$ represents a straight-chain or branched chain alkyl group having 1 to 30 carbon atoms, a straight-chain or branched chain alkenyl group having 2 to 30 carbon atoms, an aryl group having 6 to 30 carbon atoms or an aralkyl group having 7 to 30 carbon atoms. Among these, the straight-chain or branched chain alkyl group having 1 to 30 carbon atoms is preferable.

Examples of the straight-chain or branched chain alkyl group having 1 to 30 carbon atoms (preferably 3 to 25 carbon atoms, more preferably 10 to 15 carbon atoms) of $R^{112}$ include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, octadecyl, and the like.

Examples of the straight-chain or branched chain alkenyl group having 2 to 30 carbon atoms (preferably 3 to 25 carbon atoms, more preferably 10 to 15 carbon atoms) of $R^{112}$ include vinyl, 1-propenyl, 2-propenyl, 1-butenyl, 2-butenyl, 1-pentenyl, 2-pentenyl, 1-hexenyl, 2-hexenyl, 1-octenyl, decenyl, undecenyl, dodecenyl, tridecenyl, tetradecenyl, pentadecenyl, octadecenyl, and the like.

Examples of the aryl group having 6 to 30 carbon atoms (preferably 10 to 20 carbon atoms) of $R^{112}$ include phenyl, tolyl, xylyl, naphthyl, biphenyl, and the like.

Examples of the aralkyl group having 7 to 30 carbon atoms (preferably 10 to 20 carbon atoms) of $R^{112}$ include benzyl, phenethyl, and the like.

Examples of the group represented by —O—$(R^{111}$—O$)_z$—$R^{112}$ include —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, —O—$(C_2H_4$—O$)_7$—$C_{13}H_{27}$, and the like. Among these, —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$ and —O—$(C_2H_4$—O$)_6$—$C_{13}H_{27}$ are preferable.

Examples of the straight-chain or branched chain alkylene group having 1 to 6 carbon atoms (preferably 1 to 5 carbon atoms) of $R^{104}$ include groups analogous to the straight-chain or branched chain alkylene group having 1 to 30 carbon atoms of $R^{111}$.

Examples of the compound represented by the above-mentioned formula (2) include 3-mercaptopropyltrimethoxysilane, 3-mercaptopropyltriethoxysilane, 2-mercaptoethyltrimethoxysilane, 2-mercaptoethyltriethoxysilane, a compound represented by the following formula (Si363 available from Evonik-Degussa GmbH), and the like, and the compound represented by the following formula can be used suitably. These compounds may be used alone or may be used in combination of two or more thereof.

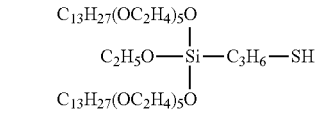

Next, the compound comprising the bonding unit A represented by the mentioned formula (3) and the bonding unit B represented by the mentioned formula (4) will be described.

The compound comprising the bonding unit A represented by the mentioned formula (3) and the bonding unit B represented by the mentioned formula (4) assures that increase in a viscosity during processing is inhibited as compared with a polysulfide silane such as bis-(3-triethoxysilylpropyl) tetrasulfide. It can be considered that the reason therefor is that since a sulfide moiety of the bonding unit A is a C—S—C bond, the compound is thermally stable as compared with a tetrasulfide and a disulfide and thus increase in a Mooney viscosity is small.

Further, as compared with a mercapto silane such as 3-mercaptopropyltrimethoxysilane, reduction of a scorch time is inhibited. It can be considered that the reason therefor is that while the bonding unit B has a mercapto silane structure, a —$C_7H_{15}$ moiety of the bonding unit A covers a —SH group of the bonding unit B, and thus the compound is hardly reacted with a polymer and scorching is hardly caused.

From the viewpoint that an effect of inhibiting increase in viscosity during the processing and an effect of inhibiting reduction of a scorching time can be enhanced, in the silane coupling agent having the above-mentioned structure, the content of the bonding unit A is preferably not less than 30 mole %, more preferably not less than 50 mole %, and preferably not more than 99 mole %, more preferably not more than 90 mole %. On the other hand, the content of the bonding unit B is preferably not less than 1 mole %, more preferably not less than 5 mole %, further preferably not less than 10 mole %, and preferably not more than 70 mole %, more preferably not more than 65 mole %, further preferably not more than 55 mole %. Further, the total content of the bonding unit A and the bonding unit B is preferably not less than 95 mole %, more preferably not less than 98 mole %, particularly preferably 100 mole %. The contents of the bonding unit A and the bonding unit B include the contents of the bonding unit A and the bonding unit B being present at a terminal of the silane coupling agent. A mode of the bonding unit A and the bonding unit B being present at a terminal of the silane coupling agent is not limited particularly, as long as it forms a unit corresponding to the formulae (3) and (4) which represent the bonding unit A and the bonding unit B, respectively.

Examples of a halogen atom of $R^{201}$ include chlorine atom, bromine atom, fluorine atom and the like.

Examples of the straight-chain or branched chain alkyl group having 1 to 30 carbon atoms of $R^{201}$ include methyl, ethyl, n-propyl, isopropyl, n-butyl, iso-butyl, sec-butyl, tert-butyl, pentyl, hexyl, heptyl, 2-ethylhexyl, octyl, nonyl, decyl and the like. The number of carbon atoms of the alkyl group is preferably from 1 to 12.

Examples of the straight-chain or branched chain alkenyl group having 2 to 30 carbon atoms of $R^{201}$ include vinyl, 1-propenyl, 2-propenyl, 1-butenyl, 2-butenyl, 1-pentenyl, 2-pentenyl, 1-hexenyl, 2-hexenyl, 1-octenyl, and the like. The number of carbon atoms of the alkenyl group is preferably from 2 to 12.

Examples of the straight-chain or branched chain alkynyl group having 2 to 30 carbon atoms of $R^{201}$ include ethynyl, propynyl, butynyl, pentynyl, hexynyl, heptynyl, octynyl, nonynyl, decynyl, undecynyl, dodecynyl, and the like. The number of carbon atoms of the alkynyl group is preferably from 2 to 12.

Examples of the straight-chain or branched chain alkylene group having 1 to 30 carbon atoms of $R^{202}$ include ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, and the like. The number of carbon atoms of the alkylene group is preferably from 1 to 12.

Examples of the straight-chain or branched chain alkenylene group having 2 to 30 carbon atoms of $R^{202}$ include vinylene, 1-propenylene, 2-propenylene, 1-butenylene, 2-butenylene, 1-pentenylene, 2-pentenylene, 1-hexenylene, 2-hexenylene, 1-octenylene, and the like. The number of carbon atoms of the alkenylene group is preferably from 2 to 12.

Examples of the straight-chain or branched chain alkynylene group having 2 to 30 carbon atoms of $R^{202}$ include ethynylene, propynylene, butynylene, pentynylene, hexynylene, heptynylene, octynylene, nonynylene, decynylene, undecynylene, dodecynylene, and the like. The number of carbon atoms of the alkynylene group is preferably from 2 to 12.

In the compound comprising the bonding unit A represented by the mentioned formula (3) and the bonding unit B represented by the mentioned formula (4), the total (x+y) of the recurring bonding units A (x) and the recurring bonding units B (y) is preferably from 3 to 300. When the total is within this range, since —$C_7H_{15}$ of the bonding unit A covers the mercapto silane of the bonding unit B, reduction of a scorch time can be inhibited and good reactivity with silica and the rubber component can be secured.

For example, NXT-Z30, NXT-Z45, NXT-Z60 and the like manufactured by Momentive can be used as the compound comprising the bonding unit A represented by the mentioned formula (3) and the bonding unit B represented by the mentioned formula (4). These may be used alone or may be used in combination of two or more thereof.

A content of the silane coupling agent having a mercapto group is preferably not less than 0.5 part by mass, more preferably not less than 1 part by mass, further preferably not less than 2 parts by mass, particularly preferably not less than 4 parts by mass based on 100 parts by mass of silica. When the content is less than 0.5 part by mass, a sufficient effect of improving fuel efficiency may not be obtained. On the other hand, the content is preferably not more than 20 parts by mass, more preferably not more than 12 parts by mass, further preferably not more than 10 parts by mass, particularly preferably not more than 9 parts by mass. When the content is more than 20 parts by mass, there is a tendency that a rubber strength and abrasion resistance decrease.

In the present disclosure, the rubber composition may comprise another silane coupling agent in addition to the above-mentioned silane coupling agent having a mercapto group. Examples of another silane coupling agent include 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazolyl tetrasulfide, 3-triethoxysilylpropyl methacrylate monosulfide, 3-trimethoxysilylpropyl methacrylate monosulfide, bis(3-triethoxysilylpropyl)tetrasulfide, bis(3-triethoxysilylpropyl) trisulfide, bis(3-triethoxysilylpropyl) disulfide, bis(2-triethoxysilylethyl)tetrasulfide, bis(3-trimethoxysilylpropyl) tetrasulfide, bis(2-trimethoxysilylethyl)tetrasulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazole tetrasulfide, and the like.

In the present disclosure, the rubber component is not limited particularly, and rubber components which have been used for rubber compositions for tire can be used. Examples thereof include diene rubber components such as natural rubber, isoprene rubber including polyisoprene rubber (IR), butadiene rubber (BR), styrene-butadiene rubber (SBR), styrene-isoprene-butadiene rubber (SIBR), chloroprene rubber (CR) and acrylonitrile-butadiene rubber (NBR), and butyl rubbers. These rubber components can be used alone or can be used in combination of two or more thereof. In particular, it is preferable that the rubber composition comprises one or more rubber components comprising a conjugated diene compound, and it is preferable that the rubber composition comprises SBR and BR from the viewpoint of a balance of fuel efficiency, abrasion resistance, durability and wet grip performance.

Further, in the present disclosure, it is preferable to use a diene rubber having a styrene content of 25 to 50% by mass and an amount of vinyl bond of 10 to 35 mole % as the diene rubber, for the reason that wet skid performance, dry grip performance and fuel efficiency can be obtained in good balance. Examples of a diene rubber comprising styrene and vinyl include SBR and SIBR.

A styrene content of the diene rubber is preferably not less than 25% by mass, more preferably not less than 28% by mass, further preferably not less than 31% by mass, from the viewpoint of grip performance. When the styrene content is too large, styrene groups become in proximity to each other, a polymer becomes too hard and crosslinking becomes non-uniform, which may deteriorate blowing property during running at high temperature, and further there is a tendency that since temperature dependency of the performances is increased and the performances can be changed largely with respect to a temperature change, stable grip performance cannot be obtained at a middle/latter stage of running. Therefore, the styrene content is preferably not more than 50% by mass, more preferably not more than 47% by mass, further preferably not more than 44% by mass. Herein, the styrene content of the diene rubber is calculated in accordance with $^1$H-NMR measurement.

An amount of vinyl bond of the diene rubber is preferably not less than 10 mole %, more preferably not less than 12 mole %, further preferably not less than 14 mole %, for security of reactivity with silica and from the viewpoint of a rubber strength and abrasion resistance. On the other hand, for prevention of increase in temperature dependency and from the viewpoint of grip performance, EB (durability) and abrasion resistance, the amount of vinyl bond of the diene rubber is preferably not more than 35 mole %, more preferably not more than 33 mole %, further preferably not more than 31 mole %. Herein, the amount of vinyl bond of SBR (an amount of 1,2-bond butadiene unit) can be determined by an infrared absorption spectrum analysis method.

When the rubber component comprises a diene rubber having a styrene content of 25 to 50% by mass and an amount of vinyl bond of 10 to 35 mole %, the content of the diene rubber in the rubber component is preferably not less than 50% by mass, more preferably not less than 60% by mass, further preferably not less than 70% by mass. When the content of the diene rubber is not less than 50% by mass, there is a tendency that change of the performances within a high temperature range can be inhibited and higher grip performance and blowing property can be exhibited. On the other hand, the content of the diene rubber is preferably not more than 90% by mass, more preferably not more than 85% by mass, further preferably not more than 80% by mass, from the viewpoint of abrasion resistance, grip performance and fuel efficiency.

Furthermore, in the above-mentioned diene rubber, the styrene content is preferably not less than 2 times, more preferably not less than 2.2 times the amount of a vinyl bond in the light of compatibility of wet skid performance with fuel efficiency. While an upper limit thereof is not limited particularly, the styrene content of the diene rubber is preferably not more than 3.0 times the amount of a vinyl bond. When the styrene content exceeds 3.0 times the amount of a vinyl bond, there is a tendency that a glass transition temperature increases excessively, and fuel efficiency and low-temperature characteristic are lowered significantly.

The SBR is not limited particularly, and there are an emulsion-polymerized SBR (E-SBR), a solution-polymerized SBR (S-SBR) and the like. The SBR may be oil-extended or may not be oil-extended. Further, a terminal-modified S-SBR and a main-chain-modified S-SBR, having enhanced interaction with a filler are also usable. Furthermore, SBRs obtained by hydrogenation of these SBRs (hydrogenated SBR) can also be used. These SBRs may be used alone or may be used in combination of two or more thereof.

The BR is not limited particularly, and for example, there can be used BR having a cis content of not less than 95% (high-cis BR), rare earth butadiene rubber synthesized using a rare-earth element catalyst (rare earth BR), BR having syndiotactic polybutadiene crystal (SPB-containing BR) and modified BR which are used generally in the tire industry. Among these, it is preferable to use high-cis BR from a point of excellent abrasion resistance.

When the BR is compounded in the rubber component, a content thereof is preferably not less than 5% by mass, more preferably not less than 10% by mass. When the content of BR is less than 5% by mass, there is a tendency that it is difficult to obtain an effect of enhancing abrasion resistance. On the other hand, the content of BR is preferably not more than 35% by mass, more preferably not more than 25% by mass. When the content of BR exceeds 35% by mass, there is a tendency that dry grip performance is lowered remarkably and wet grip performance is lowered remarkably.

In the present disclosure, silica is used. By compounding silica, fuel efficiency, abrasion resistance and wet grip performance can be enhanced. Silica is not limited particularly, and silica generally used in the rubber industry such as silica prepared by a dry method (anhydrous silica) and silica prepared by a wet method (hydrous silica) can be used. In particular, hydrous silica prepared by a wet method is preferred for the reason that many silanol groups are contained. Silica may be used alone or may be used in combination of two or more thereof.

A nitrogen adsorption specific surface area ($N_2SA$) of silica is preferably not less than 20 m$^2$/g, more preferably not less than 30 m$^2$/g, further preferably not less than 100 m$^2$/g. On the other hand, the $N_2SA$ is preferably not more than 400 m$^2$/g, more preferably not more than 300 m$^2$/g, further preferably not more than 280 m$^2$/g. When the $N_2SA$ is within the above-mentioned range, there is a tendency that fuel efficiency and processability are obtained in good balance. Herein, the $N_2SA$ of silica is a value measured by a BET method in accordance with ASTM D3037-81.

The content of silica is preferably not less than 20 parts by mass, more preferably not less than 30 parts by mass, further preferably not less than 40 parts by mass based on 100 parts by mass of the rubber component. When the content of silica is not less than 20 parts by mass, there is a tendency that an effect of enhancing fuel efficiency and abrasion resistance by compounding silica is obtained satisfactorily. The content of silica is preferably not more than 120 parts by mass, more preferably not more than 110 parts by mass, further preferably not more than 100 parts by mass based on 100 parts by mass of the rubber component. When the content of silica is not more than 120 parts by mass, there is a tendency that lowering of dispersion of silica into the rubber is inhibited, more satisfactory fuel efficiency and processability can be obtained and a sufficient effect of enhancing abrasion resistance is obtained.

In addition to the above-mentioned components, the rubber composition for tire according to the present disclosure can comprise compounding agents conventionally used in the rubber industry, for example, a reinforcing filler other than silica, a processing aid, zinc oxide, stearic acid, various anti-aging agents, a softening agent such as an adhesive resin, oils, wax, a vulcanizing agent such as sulfur, various vulcanization accelerators, and the like optionally according to necessity.

Any of various reinforcing agents other than silica such as carbon black, calcium carbonate, alumina, clay and talc which have been usually used for rubber compositions for a tire can be compounded, and from the viewpoint of excellent reinforcing property and abrasion resistance, carbon black is preferred.

Carbon black is not limited particularly, and those which are generally used in the tire industry such as GPF, FEF, HAF, ISAF and SAF can be used. These may be used alone or may be used in combination of two or more thereof.

A nitrogen adsorption specific surface area ($N_2SA$) of carbon black is preferably not less than 50 $m^2/g$, more preferably not less than 80 $m^2/g$ from the viewpoint of weather resistance and reinforcing property. Further, the $N_2SA$ of carbon black is preferably not more than 250 $m^2/g$, more preferably not more than 220 $m^2/g$ from the viewpoint of fuel efficiency, dispersivity thereof, breaking resistance and durability. Herein, the $N_2SA$ of carbon black is a value measured according to JIS K 6217 Method A.

When carbon black is compounded, the content thereof is preferably not less than 3 parts by mass, more preferably not less than 5 parts by mass based on 100 parts by mass of the rubber component, from the viewpoint of weather resistance. Further, the content of carbon black is preferably not more than 40 parts by mass, more preferably not more than 30 parts by mass from the viewpoint of fuel efficiency and processability.

Examples of the processing aid include fatty acid metal salt, fatty acid amide, amide ester, silica surfactant, fatty acid ester, a mixture of fatty acid metal salt and amide ester, a mixture of fatty acid metal salt and fatty acid amide, and the like. These may be used alone or may be used in combination of two or more thereof. Among these, fatty acid metal salt, amide ester, a mixture of fatty acid metal salt and amide ester or fatty acid amide are preferred, and a mixture of fatty acid metal salt and fatty acid amide is particularly preferred.

A fatty acid constituting the fatty acid metal salt is not limited particularly, and there are saturated or unsaturated fatty acids (preferably saturated or unsaturated fatty acids having 6 to 28 carbon atoms (more preferably 10 to 25 carbon atoms, further preferably 14 to 20 carbon atoms)). Examples thereof include lauric acid, myristic acid, palmitic acid, stearic acid, oleic acid, linoleic acid, linolenic acid, arachidic acid, behenic acid, nervonic acid, and the like. These may be used alone or may be used in combination of two or more thereof. Among these, saturated fatty acids are preferred, and saturated fatty acids having 14 to 20 carbon atoms are more preferred.

Examples of metal constituting the fatty acid metal salt include alkali metals such as potassium and sodium, alkali earth metals such as magnesium, calcium and barium, zinc, nickel, molybdenum, and the like. Among these, zinc and calcium are preferred, and zinc is more preferred.

Either saturated fatty acid amide or unsaturated fatty acid amide may be used as the fatty acid amide. Examples of saturated fatty acid amide include N-(1-oxooctadecyl)sarcosine, stearamide, behenamide, and the like. Examples of unsaturated fatty acid amide include oleamide, cis-13-docosenoamide, and the like.

Examples of a mixture of fatty acid metal salt and fatty acid amide include Struktol WB16 which is a mixture of fatty acid calcium and fatty acid amide and is available from Struktol AG, and the like. Further, examples of fatty acid zinc salt include Ultra-Flow440 available from Performance Additives, and the like.

When a processing aid is compounded, the content thereof is preferably not less than 0.8 part by mass, more preferably not less than 1.5 parts by mass based on 100 parts by mass of the rubber component. When the content is less than 0.8 part by mass, a satisfactory effect of adding the processing aid may not be obtained. On the other hand, the content is preferably not more than 10 parts by mass, more preferably not more than 8 parts by mass, further preferably not more than 6 parts by mass. When the content exceeds 10 parts by mass, sliding between the polymer phases arises, and a polymer structure in which polymer phases are entangled with each other is difficult to obtain. Thus, abrasion resistance and breaking strength tend to be lowered.

There are, as an adhesion-imparting resin, resins such as aromatic petroleum resins which have been used commonly for rubber compositions for tire. Examples of aromatic petroleum resins include a phenolic resin, a coumarone-indene resin, a terpene resin, a styrene resin, an acrylic resin, a rosin resin, a dicyclopentadiene resin (DCPD resin), and the like. Examples of the phenolic resin include Koreshin (manufactured by BASF), TACKIROL (manufactured by Taoka Chemical Co., Ltd.), and the like. Examples of the coumarone-indene resin include COUMARONE (manufactured by NITTO CHEMICAL CO., LTD.), Esukuron (manufactured by Nippon Steel Chemical Co., Ltd.), Neo polymer (manufactured by Nippon Petrochemicals Co., Ltd.), and the like. Examples of the styrene resin include Sylvatraxx 4401 (manufactured by Arizona Chemical), and the like. Examples of the terpene resin include TR7125 (manufactured by Arizona Chemical), TO125 (manufactured by Yasuhara Chemical Co., Ltd.), and the like.

A softening point of the adhesion-imparting resin is preferably not lower than 40° C., more preferably not lower than 60° C. When the softening point is not lower than 40° C., sufficient grip performance tends to be obtained. On the other hand, the softening point is preferably not higher than 120° C., more preferably not higher than 100° C. When the softening point is not higher than 120° C., sufficient grip performance tends to be obtained. In the present disclosure, the softening point of the resin is one specified in JIS K6220-1: 2001 and is a temperature at the time when the ball has dropped on a bottom plate in the measurement with the ring and ball softening point measuring device.

A content of the adhesion-imparting resin is preferably not less than 3 parts by mass, more preferably not less than 5 parts by mass based on 100 parts by mass of the rubber component. When the content is not less than 3 parts by mass, sufficient grip performance tends to be obtained, and there is a tendency that the effect of the present disclosure can be obtained more suitably. On the other hand, the content of the adhesion-imparting resin is preferably not more than 30 parts by mass, more preferably not more than 25 parts by mass. When the content is not more than 30 parts by mass, sufficient abrasion resistance tends to be obtained, and good fuel efficiency tends to be obtained.

For zinc oxide, stearic acid, various anti-aging agents, oils and wax, those which have been used in the rubber industry can be used.

The vulcanizing agent is not limited particularly, and those which are generally used in rubber industries can be used, and those containing sulfur atoms are preferable. Examples thereof include powdered sulfur, precipitated sulfur, colloidal sulfur, surface-treated sulfur, insoluble sulfur, and the like.

The vulcanization accelerator is not limited particularly, and examples thereof include sulfenamide-, thiazole-, thiuram-, thiourea-, guanidine-, dithiocarbamate-, aldehyde amine- or aldehyde ammonia-, imidazoline- and xanthate-based vulcanization accelerators. Among these, sulfenamide-, thiuram- and guanidine-based vulcanization accelerators are preferred from a point that the effect of the present disclosure can be obtained more suitably.

Examples of sulfenamide-based vulcanization accelerators include CBS (N-cyclohexyl-2-benzothiazolylsulfenamide), TBBS (N-t-butyl-2-benzothiazolylsulfenamide), N-oxyehylene-2-benzothiazolylsulfenamide, N,N'-diisopropyl-2-benzothiazolylsulfenamide, N,N-dicyclohexyl-2-benzothiazolylsulfenamide, and the like. Examples of thiazole-based vulcanization accelerators include 2-mercaptobenzothiazole, dibenzothiazolyldisulfide, and the like. Examples of thiuram-based vulcanization accelerators include tetramethylthiuram monosulfide, tetramethylthiuram disulfide, tetrabenzylthiuram disulfide (TBzTD), and the like. Examples of guanidine-based vulcanization accelerators include diphenylguanidine (DPG), di-o-tolylguanidine, o-tolylbiguanidine, and the like. These may be used alone or may be used in combination of two or more thereof. Among these, TBBS, TBzTD and DPG are preferred, and combination use of these three vulcanization accelerators is more preferred from a point that the effect of the present disclosure can be obtained suitably.

As mentioned above, in the method of preparing a rubber composition for a tire of the present disclosure, as far as the rubber component and the compound of the above-mentioned formula (1) are kneaded before kneading the silane coupling agent having a mercapto group with the rubber component, the preparation method is not limited particularly. For example, the preparation method can be carried out by kneading the rubber component and the compound of the formula (1) in an X-kneading step (a step X) and thereafter kneading, in a Y-kneading step (a step Y), the silane coupling agent having a mercapto group with the kneaded product obtained in the step X. Alternatively in the step X, the rubber component and the compound of the formula (1) may be kneaded for a given period of time (a step X1), and thereafter, without discharging the kneaded product, the silane coupling agent having a mercapto group may be added, followed by further kneading.

In the step X, silica can be further kneaded. While a timing of adding silica in the step X is not limited particularly, in the case of adding chemicals dividedly in the step X, it is preferable to add silica after addition of the compound of the formula (1). Further, in the case of charging the silane coupling agent having a mercapto group in the step X, silica may be added simultaneously with the addition of the silane coupling agent having a mercapto group, or it is more preferable to add silica earlier than the addition of the silane coupling agent having a mercapto group.

Furthermore, kneading of silica with the rubber component may be conducted in any of steps except an F-kneading step (a step F) where a vulcanizing agent is kneaded, and it is preferable that by dividing the total amount of silica, the divided amounts of silica are kneaded in the respective steps.

As far as the silane coupling agent having a mercapto group is kneaded with the rubber component after the kneading of the compound of the formula (1), the kneading of the silane coupling agent can be performed dividedly in the respective kneading steps.

In one embodiment of the method of preparing a rubber composition for a tire of the present disclosure, a kneaded product X is obtained, for example, by kneading the rubber component and the compound represented by the formula (1) (step X1); adding and kneading the reinforcing agents such as carbon black and silica (step X2); and further adding and kneading the silane coupling agent having a mercapto group (step X3), followed by discharging. Thereafter, silica and the silane coupling agent having a mercapto group are added to the kneaded product X, followed by kneading (step Y) and then discharging to obtain a kneaded product Y. Next, silica and the silane coupling agent having a mercapto group are added to the kneaded product Y, followed by kneading (step Z) and then discharging to obtain a kneaded product Z. Then an unvulcanized rubber composition can be obtained by adding the vulcanizing agent and the vulcanization accelerator to the obtained kneaded product Z and subjecting the mixture to kneading (step F).

It is preferable that the kneading in the step X is performed at a discharge temperature of 140° C. to 170° C. for 1 to 5 minutes. It is preferable that the kneaded product obtained in the step X is used for the following steps after having been cooled to a temperature of usually not higher than 80° C., preferably 25° C. to 45° C.

It is preferable that the kneading in the step Y is performed at a discharge temperature of 130° C. to 160° C. for 1 to 5 minutes. It is preferable that the kneaded product obtained in the step Y is used for the following steps after having been cooled to a temperature of usually not higher than 80° C., preferably 25° C. to 45° C.

It is preferable that the kneading in the step Z is performed at a discharge temperature of 130° C. to 160° C. for 1 to 5 minutes. It is preferable that the kneaded product obtained in the step Z is used for the following steps after having been cooled to a temperature of usually not higher than 80° C., preferably 25° C. to 45° C.

It is preferable that the kneading in the step F is performed at a discharge temperature of 90° C. to 130° C. for 1 to 5 minutes.

For each of the kneading steps in the method of preparing a rubber composition for a tire of the present disclosure, known kneading equipment can be used, and there are, for example, a Banbury mixer, a kneader, an open roll, and the like which perform kneading and mixing by applying a mechanical shearing force to a material to be kneaded.

The rubber composition for tire of the present disclosure is a rubber composition for tire which comprises the rubber component, the silane coupling agent having a mercapto group and the compound represented by the formula (1), is prepared by kneading the silane coupling agent having a mercapto group with the rubber component subjected to kneading with the polysulfide compound, and has improved processability. The reason therefor is considered to be such that as mentioned above, the compound of the formula (1) kneaded with the rubber component forms —S—S— bond with the mercapto group of the added silane coupling agent having a mercapto group, thereby preventing gelation of the rubber component attributable to the silane coupling agent.

The rubber composition for a tire of the present disclosure can be used on each of tire members such as tread, under tread, carcass, side wall and bead. In particular, a tire having a tread formed from the rubber composition of the present disclosure is preferable since it has excellent abrasion resistance.

The method of producing a tire of the present disclosure is a method of producing a tire comprising a forming step of subjecting the unvulcanized rubber composition prepared by the preparation method of the present disclosure to extrusion processing to a shape of a member of a tire such as a tread and then forming together with other tire members on a tire building machine by a usual forming method, thus forming an unvulcanized tire, and a vulcanizing step of heating and compressing this unvulcanized tire in a vulcanizer. A vulcanization temperature is, for example, not lower than 120° C. and not higher than 200° C. It does not matter whether the tire according to the present disclosure is used on a pneumatic tire or a non-pneumatic tire. Examples of a pneumatic tire include tires for passenger cars, tires for trucks and buses, tires for two-wheeled vehicles, high performance tires, and the like. Herein, high performance tires mean tires particularly being excellent in grip performance, and is a concept encompassing tires used on racing cars.

EXAMPLE

The present disclosure is explained by means of Examples, but is not limited to the Examples.
Various chemicals used in Examples and Comparative examples are collectively shown below.
SBR: SLR6430 available from TRINSEO S.A. (S-SBR, styrene content: 40% by mass, an amount of vinyl bond: 18 mole %, an oil-extended rubber containing 37.5 parts by mass of oil to 100 parts by mass of rubber component)
BR: BR150B manufactured by Ube Industries, Ltd., (cis-1,4 content: 97%)
Compound of the formula (1): Retarder PVI (N-cyclohexylthiophthalimide) manufactured by Monsant Chemical Co., Ltd.
Fine particles carbon black: DIABLACK (registered trademark) XR available from Mitsubishi Chemical Corporation ($N_2SA$: 180 $m^2/g$)
Silica: ULTRASIL (registered trademark) VN3 available from Evonik Degussa GmbH ($N_2SA$: 175 $m^2/g$)
Silane coupling agent A: NXT-Z45 available from Momentive Performance Materials Inc. (a copolymer of a bonding unit A and a bonding unit B (bonding unit A: 55 mole %, bonding unit B: 45 mole %))
Silane coupling agent B: Si363 manufactured by Evonik Degussa GmbH
Zinc oxide: ZINC FLOWER No. 1 available from Mitsui Mining & Smelting Co., Ltd.
Stearic acid: Stearic acid "Tsubaki" available from NOF CORPORATION
Wax: OZOACE 0355 manufactured by Nippon Seiro Co., Ltd. (paraffin)
Oil: VivaTec400 (TDAE oil) manufactured by H&R Co., Ltd.
Styrene resin: SylvaTraxx (registered trademark) 4401 available from Arizona Chemical (softening point: 85° C.)
Anti-aging agent (1): Antigen 6C (N-(1,3-dimethylbutyl)-N'-phenyl-p-phenylenediamine) available from Sumitomo Chemical Company, Limited
Anti-aging agent (2): Nocrac 224 (TMQ, Polymerized 2,2,4-trimethyl-1,2-dihydroquinoline) manufactured by OUCHI SHINKO CHEMICAL INDUSTRIAL CO., LTD.
Processing aid (1): Ultra-Flow (registered trademark) 440 available from Performance Additives (natural fatty acid zinc/metal soap)
Processing aid (2): Struktol WB16 available from Schill & Seilacher Struktol GmbH (a mixture of fatty acid ester and fatty acid metal salt)
Sulfur: HK-200-5 available from Hosoi Chemical Industry Co., Ltd. (powdered sulfur containing 5% oil)
Vulcanization accelerator (1): SANCELER NS-G (N-tert-butyl-2-benzothiazole sulfenamide (TBBS)) manufactured by SANSHIN CHEMICAL INDUSTRY CO., LTD.
Vulcanization accelerator (2): SANCELER TBZTD (tetrabenzylthiuram disulfide (TBzTD)) manufactured by SANSHIN CHEMICAL INDUSTRY CO., LTD.
Vulcanization accelerator (3): Nocceler D (N,N'-diphenylguanidine) manufactured by OUCHI SHINKO CHEMICAL INDUSTRIAL CO., LTD.)

Examples 1 to 7 and Comparative Examples 1 to 6

According to the formulations shown in Table 1, various chemicals shown in the step X1 were kneaded for 20 seconds with a 1.7 liter Banbury mixer. Thereafter, various chemicals shown in the step X2 of Table 1 were added, followed by kneading for 80 seconds. Then various chemicals shown in the step X3 of Table 1 were added, followed by kneading for 80 seconds, and a kneaded product was discharged at a discharge temperature of 160° C. The obtained kneaded products were cooled to about 30° C. to be used in the following step.
Next, to the obtained kneaded products were added other various chemicals according to the formulations shown in the step Y of Table 1, followed by kneading for two minutes at a discharge temperature of 150° C. The obtained kneaded products were cooled to about 30° C. to be used in the following step. Thereafter, to the kneaded products obtained in the step Y were added other various chemicals according to the formulations shown in the step Z of Table 1, followed by kneading for two minutes at a discharge temperature of 145° C. The obtained kneaded products were cooled to about 30° C. to be used in the following step. To the kneaded products obtained in the step Z were added sulfur and vulcanization accelerators according to the formulations shown in the step F of Table 1, followed by kneading for three minutes under a discharge temperature of 125° C. with an open roll to obtain unvulcanized rubber compositions.
Each of the obtained unvulcanized rubber compositions were subjected to press vulcanization for 12 minutes at 170° C. with a metal mold having a thickness of 2 mm to obtain vulcanized rubber compositions.
Further, the obtained unvulcanized rubber compositions were formed into a shape of a tread and laminated together with other tire members to form unvulcanized tires which were then subjected to vulcanization for 15 minutes at 165° C. to produce tires (tire size: 205/55R16).

Examples 8 and 9 and Comparative Examples 7 to 11

Unvulcanized rubber compositions, vulcanized rubber compositions and tires were produced according to the formulations shown in Table 2 in the same manner as in Example 1 except that the addition of chemicals in the step X was not carried out stepwise.
Processability of the unvulcanized rubber compositions obtained in Example 1 to 9 and Comparative Examples 1 to 11 were evaluated by the following test. The results are shown in Tables 1 and 2.
<Processability (Average Surface Roughness Ra)>
One kg of an unvulcanized rubber composition was wound in a width of 30 cm and a thickness of 2 mm on an 8-inch open roll and was subjected to kneading until a rubber temperature reaches 95±5° C. to obtain a rubber sheet. Then the obtained rubber sheet was cut and a surface roughness of a rubber compound was measured with a surface roughness meter based on arithmetic mean roughness Ra of JIS B0601. The obtained results are expressed as an index by the following formula using Comparative Example 1 as a reference comparative example for Examples 1 to 6 and 8 and Comparative Examples 2 to 4 and 7 to 9, and using Comparative Example 5 as a reference comparative example for Examples 7 and 9 and Comparative Examples 6, 10 and 11.

(Processability index)=100×Surface roughness Ra of Reference Comparative Example/Surface roughness Ra of Each Example

TABLE 1

| Compounding amount (part by mass) | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Step X | | | | | | | | | | | | | |
| Step X1 | | | | | | | | | | | | | |
| SBR | 110 | 110 | 110 | 110 | 110 | 110 | 82.5 | 110 | 110 | 110 | 110 | 82.5 | 82.5 |
| BR | 20 | 20 | 20 | 20 | 20 | 20 | 40 | 20 | 20 | 20 | 20 | 40 | 40 |
| Compound PVI of formula (1) | 0.5 | 0.3 | 1 | 2 | 0.5 | 0.5 | 0.5 | — | — | — | — | — | — |
| Step X2 | | | | | | | | | | | | | |
| Carbon black | 5 | 5 | 5 | 5 | 5 | 5 | 5 | 5 | 5 | 5 | 5 | 5 | 5 |
| Silica | 55 | 55 | 55 | 55 | 55 | 55 | 55 | 55 | 55 | 55 | 55 | 55 | 55 |
| Wax | 2 | 2 | 2 | 2 | 2 | 2 | 2 | 2 | 2 | 2 | 2 | 2 | 2 |
| Processing aid (1) | 2 | 2 | 2 | 2 | 2 | 2 | 2 | 2 | 2 | 2 | 2 | 2 | 2 |
| Step X3 | | | | | | | | | | | | | |
| Silica | 10 | 10 | 10 | 10 | 10 | 10 | 10 | 10 | 10 | 10 | 10 | 10 | 10 |
| Silane coupling agent A | 5 | 5 | 5 | 5 | — | — | 5 | 5 | 5 | 5 | — | 5 | 5 |
| Silane coupling agent B | — | — | — | — | — | 5 | — | — | — | — | 5 | — | — |
| Compound PVI of formula (1) | — | — | — | — | — | — | — | — | 0.5 | — | 0.5 | — | 0.5 |
| Oil | 5 | 5 | 5 | 5 | 5 | 5 | 5 | 5 | 5 | 5 | 5 | 5 | 5 |
| Step Y | | | | | | | | | | | | | |
| Silica | 25 | 25 | 25 | 25 | 25 | 25 | 25 | 25 | 25 | 25 | 25 | 25 | 25 |
| Silane coupling agent A | 2 | 2 | 2 | 2 | 7 | — | 2 | 2 | 2 | 2 | — | 2 | 2 |
| Silane coupling agent B | — | — | — | — | — | 2 | — | — | — | — | 2 | — | — |
| Compound PVI of formula (1) | — | — | — | — | — | — | — | — | — | 0.5 | — | — | — |
| Styrene resin | 10 | 10 | 10 | 10 | 10 | 10 | 10 | 10 | 10 | 10 | 10 | 10 | 10 |
| Stearic acid | 3 | 3 | 3 | 3 | 3 | 3 | 3 | 3 | 3 | 3 | 3 | 3 | 3 |
| Oil | 3 | 3 | 3 | 3 | 3 | 3 | 3 | 3 | 3 | 3 | 3 | 3 | 3 |
| Step Z | | | | | | | | | | | | | |
| Silica | 10 | 10 | 10 | 10 | 10 | 10 | 10 | 10 | 10 | 10 | 10 | 10 | 10 |
| Silane coupling agent A | 1 | 1 | 1 | 1 | 1 | — | 1 | 1 | 1 | 1 | — | 1 | 1 |
| Silane coupling agent B | — | — | — | — | — | 1 | — | — | — | — | 1 | — | — |
| Processing aid (2) | 3 | 3 | 3 | 3 | 3 | 3 | 3 | 3 | 3 | 3 | 3 | 3 | 3 |
| Oil | 3 | 3 | 3 | 3 | 3 | 3 | 3 | 3 | 3 | 3 | 3 | 3 | 3 |
| Step F | | | | | | | | | | | | | |
| Sulfur | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator (1) | 2 | 2 | 2 | 2 | 2 | 2 | 2 | 2 | 2 | 2 | 2 | 2 | 2 |
| Vulcanization accelerator (2) | 0.5 | 0.5 | 0.5 | 0.5 | 0.5 | 0.5 | 0.5 | 0.5 | 0.5 | 0.5 | 0.5 | 0.5 | 0.5 |
| Vulcanization accelerator (3) | 2 | 2 | 2 | 2 | 2 | 2 | 2 | 2 | 2 | 2 | 2 | 2 | 2 |
| Zinc oxide | 2 | 2 | 2 | 2 | 2 | 2 | 2 | 2 | 2 | 2 | 2 | 2 | 2 |
| Anti-aging agent (1) | 3 | 3 | 3 | 3 | 3 | 3 | 3 | 3 | 3 | 3 | 3 | 3 | 3 |
| Anti-aging agent (2) | 1 | 1 | 1 | 1 | 1 | 1 | 1 | 1 | 1 | 1 | 1 | 1 | 1 |
| Evaluation | | | | | | | | | | | | | |
| Processability index (Surface roughness Ra) | 117 | 115 | 118 | 119 | 123 | 115 | 115 | 100 | 103 | 101 | 104 | 100 | 103 |

TABLE 2

| Compounding amount (part by mass) | Example | | Comparative Example | | | | |
|---|---|---|---|---|---|---|---|
| | 8 | 9 | 7 | 8 | 9 | 10 | 11 |
| Step X | | | | | | | |
| SBR | 110 | 82.5 | 110 | 110 | 110 | 82.5 | 82.5 |
| BR | 20 | 40 | 20 | 20 | 20 | 40 | 40 |
| Compound PVI of formula (1) | 0.5 | 0.5 | — | 0.5 | — | — | 0.5 |
| Carbon black | 5 | 5 | 5 | 5 | 5 | 5 | 5 |
| Silica | 65 | 65 | 65 | 65 | 65 | 65 | 65 |
| Silane coupling agent A | — | — | 5 | 5 | 5 | 5 | 5 |
| Silane coupling agent B | — | — | — | — | — | — | — |
| Wax | 2 | 2 | 2 | 2 | 2 | 2 | 2 |
| Processing aid (1) | 2 | 2 | 2 | 2 | 2 | 2 | 2 |
| Oil | 5 | 5 | 5 | 5 | 5 | 5 | 5 |
| Step Y | | | | | | | |
| Silica | 25 | 25 | 25 | 25 | 25 | 25 | 25 |
| Silane coupling agent A | 7 | 7 | 2 | 2 | 2 | 2 | 2 |
| Silane coupling agent B | — | — | — | — | — | — | — |

TABLE 2-continued

| Compounding amount (part by mass) | Example | | Comparative Example | | | | |
|---|---|---|---|---|---|---|---|
| | 8 | 9 | 7 | 8 | 9 | 10 | 11 |
| Compound PVI of formula (1) | — | — | — | — | 0.5 | — | — |
| Styrene resin | 10 | 10 | 10 | 10 | 10 | 10 | 10 |
| Stearic acid | 3 | 3 | 3 | 3 | 3 | 3 | 3 |
| Oil | 3 | 3 | 3 | 3 | 3 | 3 | 3 |
| Step Z | | | | | | | |
| Silica | 10 | 10 | 10 | 10 | 10 | 10 | 10 |
| Silane coupling agent A | 1 | 1 | 1 | 1 | 1 | 1 | 1 |
| Silane coupling agent B | — | — | — | — | — | — | — |
| Processing aid (2) | 3 | 3 | 3 | 3 | 3 | 3 | 3 |
| Oil | 3 | 3 | 3 | 3 | 3 | 3 | 3 |
| Step F | | | | | | | |
| Sulfur | 1.5 | 1.5 | 1.5 | 1.5 | 1.5 | 1.5 | 1.5 |
| Vulcanization accelerator (1) | 2 | 2 | 2 | 2 | 2 | 2 | 2 |
| Vulcanization accelerator (2) | 0.5 | 0.5 | 0.5 | 0.5 | 0.5 | 0.5 | 0.5 |
| Vulcanization accelerator (3) | 2 | 2 | 2 | 2 | 2 | 2 | 2 |
| Zinc oxide | 2 | 2 | 2 | 2 | 2 | 2 | 2 |
| Anti-aging agent (1) | 3 | 3 | 3 | 3 | 3 | 3 | 3 |
| Anti-aging agent (2) | 1 | 1 | 1 | 1 | 1 | 1 | 1 |
| Evaluation | | | | | | | |
| Processability index (Surface roughness Ra) | 122 | 121 | 99 | 103 | 101 | 98 | 103 |

From the results shown in Tables 1 and 2, it can be seen that in Comparative Examples 1 and 5, where a silane coupling agent having a mercapto group was used but the compound of the formula (1) was not used, processability was not good, and that in Comparative Examples 2, 4 and 6, where the compound of the formula (1) was kneaded at the same time as in the kneading of the silane coupling agent having a mercapto group, processability was improved as compared to those of Comparative Examples 1 and 5 but was not sufficient. It can be seen that in any of Examples 1 to 9, where the compound of the formula (1) was kneaded with a rubber component before kneading a silane coupling agent having a mercapto group with a rubber component, processability was enhanced remarkably.

What is claimed is:

1. A method of preparing a rubber composition for a tire comprising initiating kneading of a rubber component and a polysulfide compound represented by the following formula (1) before kneading the rubber component and a silane coupling agent having a mercapto group:

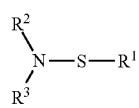

(1)

wherein $R^1$ represents a straight-chain or branched chain alkyl group having 1 to 18 carbon atoms or a cycloalkyl group having 3 to 12 carbon atoms, and $R^2$ and $R^3$ together with nitrogen bonded thereto form a succinimide group, a maleimide group or a phthalimide group.

2. The preparation method of claim 1, wherein the rubber component comprises not less than 50% by mass of a diene rubber having a styrene content of 25 to 50% by mass and an amount of a vinyl bond of 10 to 35 mole %.

3. The preparation method of claim 2, wherein the styrene content is not less than 2 times the amount of a vinyl bond.

4. The preparation method of claim 1, wherein the silane coupling agent having a mercapto group is a compound represented by the following formula (2) and/or a compound comprising a bonding unit A represented by the following formula (3) and a bonding unit B represented by the following formula (4):

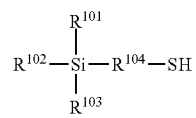

(2)

wherein $R^{101}$ to $R^{103}$ represent a straight-chain or branched chain alkyl group having 1 to 12 carbon atoms, a straight-chain or branched chain alkoxy group having 1 to 12 carbon atoms, or a group represented by $-O-(R^{111}-O)_z-R^{112}$ (z $R^{111}$s represent straight-chain or branched chain divalent hydrocarbon groups having 1 to 30 carbon atoms, z $R^{111}$s may be the same or different, $R^{112}$ represents a straight-chain or branched chain alkyl group having 1 to 30 carbon atoms, a straight-chain or branched chain alkenyl group having 2 to 30 carbon atoms, an aryl group having 6 to 30 carbon atoms or an aralkyl group having 7 to 30 carbon atoms, z represents an integer of 1 to 30), $R^{101}$ to $R^{103}$ may be the same or different, and $R^{104}$ represents a straight-chain or branched chain alkylene group having 1 to 6 carbon atoms, (3)

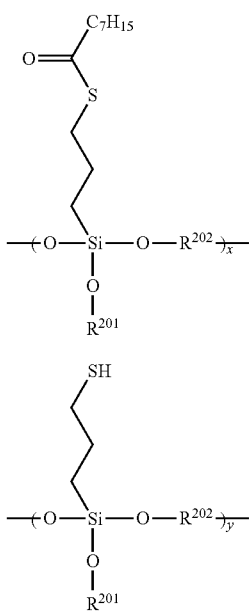

(4)

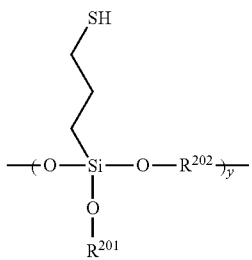

wherein x is an integer of 0 or more, y is an integer of 1 or more, $R^{201}$ represents a hydrogen atom, a halogen atom, a straight-chain or branched chain alkyl group having 1 to 30 carbon atoms, a straight-chain or branched chain alkenyl group having 2 to 30 carbon atoms, a straight-chain or branched chain alkynyl group having 2 to 30 carbon atoms, or the alkyl group in which a terminal hydrogen atom has been replaced with a hydroxyl group or a carboxyl group, $R^{202}$ represents a straight-chain or branched chain alkylene group having 1 to 30 carbon atoms, a straight-chain or branched chain alkenylene group having 2 to 30 carbon atoms, or a straight-chain or branched chain alkynylene group having 2 to 30 carbon atoms, and a ring structure may be formed with $R^{201}$ and $R^{202}$.

5. A method of producing a tire comprising a step of forming a tire member from the rubber composition for tire obtained by the preparation method of claim 1 and forming a green tire by combining the tire member with other tire members, and a vulcanization step of vulcanizing the green tire obtained in the forming step.

6. A rubber composition for tire comprising a rubber component, a silane coupling agent having a mercapto group and a polysulfide compound represented by the following formula (1), which is prepared by kneading the silane coupling agent having a mercapto group with the rubber component with which the polysulfide compound is kneaded,

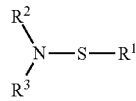

(1)

wherein $R^1$ represents a straight-chain or branched chain alkyl group having 1 to 18 carbon atoms or a cycloalkyl group having 3 to 12 carbon atoms, and $R^2$ and $R^3$ together with nitrogen bonded thereto form a succinimide group, a maleimide group or a phthalimide group.

* * * * *